United States Patent
Cui et al.

(10) Patent No.: US 7,170,530 B2
(45) Date of Patent: Jan. 30, 2007

(54) IMAGE-BASED CLIPPING

(75) Inventors: Jian Cui, Fairfax, VA (US); Jim X. Chen, Fairfax Station, VA (US)

(73) Assignee: George Mason Intellectual Properties, Inc., Fairfax, VA (US)

(*) Notice: Subject to any disclaimer, the term of this patent is extended or adjusted under 35 U.S.C. 154(b) by 0 days.

(21) Appl. No.: 11/165,539

(22) Filed: Jun. 24, 2005

(65) Prior Publication Data

US 2006/0290715 A1  Dec. 28, 2006

(51) Int. Cl.
G09G 5/00  (2006.01)
(52) U.S. Cl. .......................... 345/620; 345/627
(58) Field of Classification Search ........ 345/620–627, 345/512

See application file for complete search history.

(56) References Cited

U.S. PATENT DOCUMENTS

| | | | | |
|---|---|---|---|---|
| 5,613,052 | A * | 3/1997 | Narayanaswami | 345/627 |
| 5,767,859 | A * | 6/1998 | Rossin et al. | 345/620 |
| 5,777,625 | A * | 7/1998 | Rossin | 345/620 |
| 6,590,582 | B1 * | 7/2003 | Eo | 345/620 |
| 6,686,924 | B1 * | 2/2004 | Mang et al. | 345/620 |
| 2002/0030693 | A1 * | 3/2002 | Baldwin | 345/620 |
| 2005/0116948 | A1 * | 6/2005 | Joe et al. | 345/421 |

OTHER PUBLICATIONS

Olano et al., Triangle Scan Conversion using 2D Homogeneous Coordinates, 1997, ACM SIGGRAPH Eurographics Workshop, pp. 89-95.*
Whitman, A load balanced SIMD polygon renderer, 1995, ACM Proceedings of the IEEE symposium on parallel rendering, pp. 63-69 and 106.*
Pineda et al, A parallel algorithm for polygon rasterization, 1988, ACM SIGGRAPH, pp. 17-20.*

* cited by examiner

*Primary Examiner*—Kee M. Tung
*Assistant Examiner*—Motilewa Good-Johnson
(74) *Attorney, Agent, or Firm*—David G. Grossman

(57) ABSTRACT

Disclosed is a tangible computer-readable medium encoded with an image-based clipping computer program. This image-based clipping computer program when executed by one or more processors should cause the processor(s) to generate a clipped pattern. To generate this clipped pattern, the processors preferably select a pattern using coordinates from an original shape; initialize a clipped pattern to the selected shapes pattern; calculate a first and second pixel where an original triangle intersects the bounds of a view volume; calculate a cutting edge which runs through the first pixel and the second pixel; select a clipping pattern(s) according to the relative position of cutting edge and the bounding box and perform a logical AND operation with the clipped shape and the selected clipping pattern(s).

16 Claims, 7 Drawing Sheets

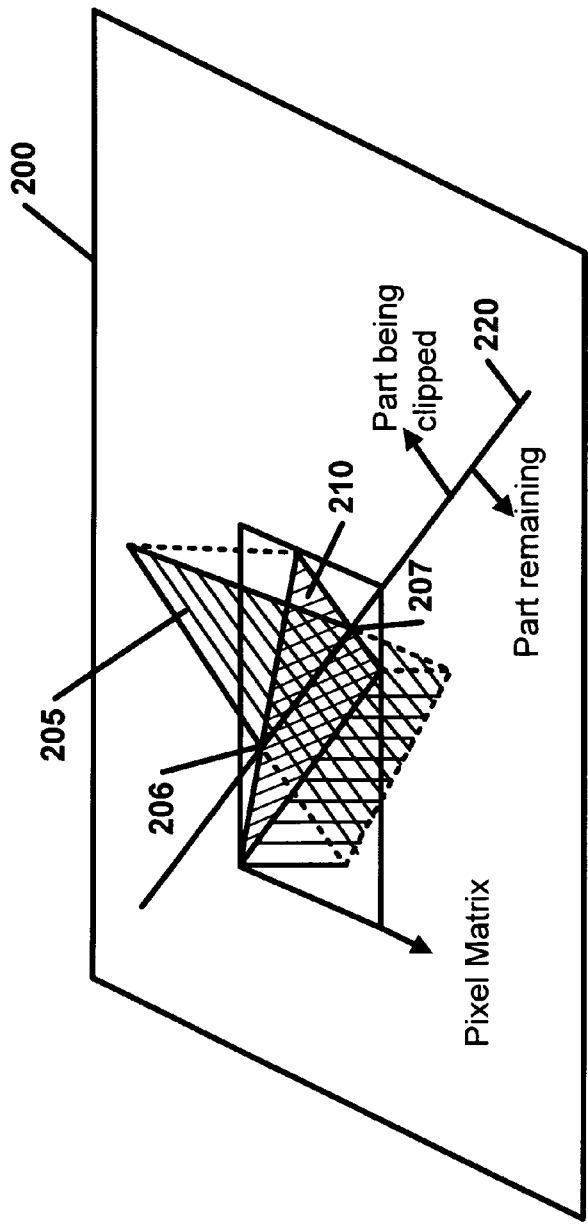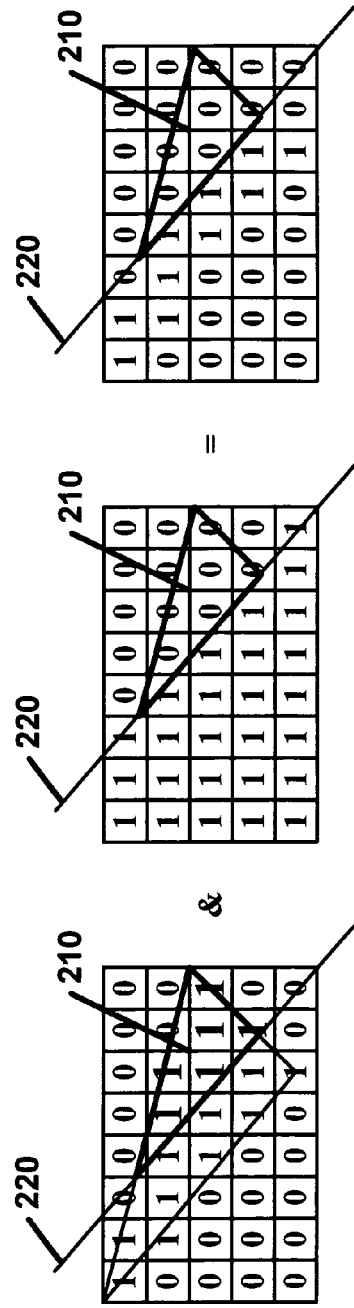
FIG. 2A
FIG. 2B & FIG. 2C = FIG. 2D

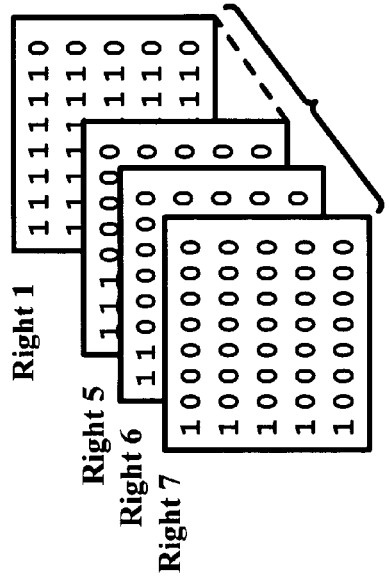
FIG. 3B
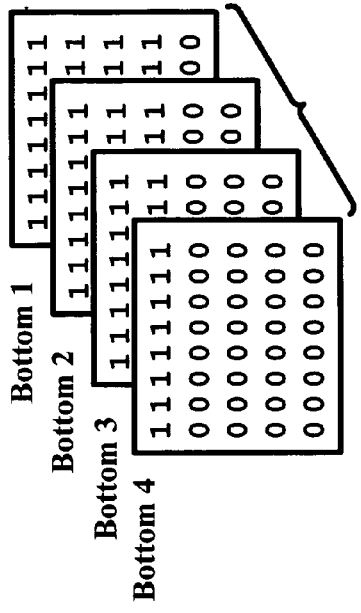
FIG. 3D
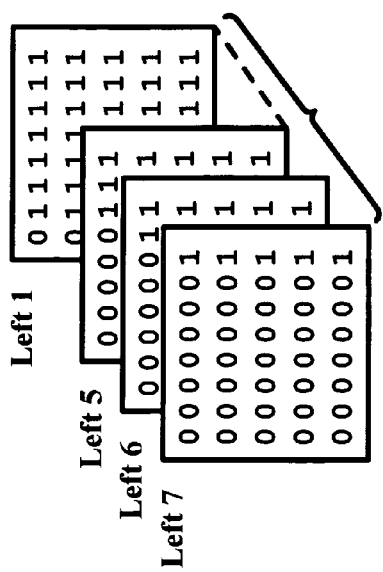
FIG. 3A
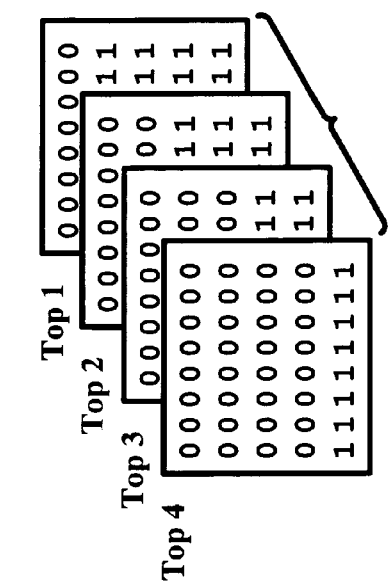
FIG. 3C
FIG. 3

| P1=0 | P2 is in the range of $8 \leq P2 \leq 17$ |
|---|---|
| For each P1 that $1 \leq P1 \leq 6$ | P2 is in the range of $8 \leq P2 \leq 21$ |
| For each P1 that $7 \leq P1 \leq 10$ | P2 is in the range of $12 \leq P2 \leq 21$ |
| For each P1 that $11 \leq P1 \leq 17$ | P2 is in the range of $19 \leq P2 \leq 21$ |

FIG. 6

| | | |
|---|---|---|
| Positive Pattern | $X_1 \neq X_2$ | $P(x,y) = \begin{cases} 1, & if \dfrac{y_2-y_1}{x_2-x_1} \times (x-x_1) + y_1 \geq y \\ 0, & if \dfrac{y_2-y_1}{x_2-x_1} \times (x-x_1) + y_1 < y \end{cases}$ |
| | $X_1 = X_2$ | $P(x,y) = \begin{cases} 1, & if \quad x \leq x_1 \\ 0, & if \quad x > x_1 \end{cases}$ |
| Negative Pattern | $X_1 \neq X_2$ | $P(x,y) = \begin{cases} 0, & if \dfrac{y_2-y_1}{x_2-x_1} \times (x-x_1) + y_1 \geq y \\ 1, & if \dfrac{y_2-y_1}{x_2-x_1} \times (x-x_1) + y_1 < y \end{cases}$ |
| | $X_1 = X_2$ | $P(x,y) = \begin{cases} 0, & if \quad x \leq x_1 \\ 1, & if \quad x > x_1 \end{cases}$ |

FIG. 7

IMAGE-BASED CLIPPING

BACKGROUND OF THE INVENTION

1. Field of the Invention

The present invention relates to the filed of computer graphic imaging. Specifically, the present invention is an image-based triangle clipping mechanism that is particularly well suited for clipping triangles in combination with triangle imaging technologies such as a triangle scan-converter.

2. Description of Related Art

Triangles are the basic components of drawing complicated objects in computer graphics. Scientists working in this area have the experiences that most of the triangles drawn by graphics applications are smaller ones. An analysis of the distribution of the sizes and shapes of triangles in various graphics applications found that most of the triangles are small in these applications. More specifically, an 8×5 rectangle area can accommodate approximately 69% of all the triangles, a 12×8 area includes approximately 80% of all the triangles, and approximately 95% of the triangles can be held in a 40×30 area. Based on these values, a new image-based fast small triangle scan-conversion mechanism was developed by J. Cui and J. Chen, and reported in a paper entitled "Image-Based Fast Small Triangle Scan-Conversion" (sent to ACM Transactions on Graphics under review, 2003).

The image-based fast small triangle scan-conversion uses a width×height (e.g. 8×5) pixel matrix (rectangular pixel area) to save a triangle pattern, and therefore a pixel matrix array to save all possible small triangles patterns. An index scheme is used to reference the matrix array. When a program calls to draw a small triangle, an index is used to quickly locate the position of the triangle's pattern in the pixel matrix array and scan-convert it directly into the frame buffer. However, some of these triangles extend past the border of the viewing volume. Therefore, what is needed is a new 3D clipping mechanism which may be used with this image-based fast small triangle scan conversion mechanism.

BRIEF SUMMARY OF THE INVENTION

In accordance with all of the invention as embodied and broadly described herein, is a tangible computer-readable medium encoded with an image-based triangle clipping computer program. This image-based triangle clipping computer program when executed by one or more processors should cause the processor(s) to generate a clipped pattern. To generate this clipped pattern, the processors preferably select a triangle pattern using coordinates from an original triangle; initialize a clipped pattern to the selected triangle pattern; calculate a first and second pixel where an original triangle intersects the bounds of a view volume; calculate a cutting edge which runs through the first pixel and the second pixel; select a clipping pattern(s) according to the relative position of cutting edge and the bounding box and perform a logical AND operation with the clipped triangle and the selected clipping pattern(s).

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 2A shows clipping of a sample triangle for near/far clipping planes as per an aspect of an embodiment of the present invention.

FIG. 2B shows a triangle projection in a pixel matrix of a sample triangle as per an aspect of an embodiment of the present invention.

FIG. 2C shows a pre-stored clipping pattern of a sample triangle as per an aspect of an embodiment of the present invention.

FIG. 2D shows a clipping result of a sample triangle as per an aspect of an embodiment of the present invention.

FIG. 3A shows pre-stored left plane clipping patterns as per an aspect of an embodiment of the present invention.

FIG. 3B shows pre-stored right plane clipping patterns as per an aspect of an embodiment of the present invention.

FIG. 3C shows pre-stored top plane clipping patters as per an aspect of an embodiment of the present invention.

FIG. 3D shows pre-stored bottom plane clipping patterns as per an aspect of an embodiment of the present invention.

FIG. 6 is a table showing a combination list of P1 and P2 as per an aspect of an embodiment of the present invention.

FIG. 7 is a table showing a pixel value deciding rule for positive and negative patterns as per an aspect of an embodiment of the present invention.

DETAILED DESCRIPTION OF THE INVENTION

The present invention is an 3-D image-based triangle clipping mechanism that is particularly well suited for clipping triangles in combination with triangle imaging technologies such as a triangle scan-converter. This invention masks the part of a small triangle (or other shape) that will be clipped. Image-based fast small triangle scan conversion mechanisms generally pre-store patterns of small triangles as an array of pixel matrices. To scan-convert a triangle to frame buffer, the pattern of the triangle is first fetched. Pixels of the triangle pattern that will be clipped out by the clipping plane should be set to 0 after the operation. To implement the new clipping mechanism, clipping patterns which are the same size pixel matrix as the triangle pattern should be pre-store along with the triangle patterns.

Figure 1:
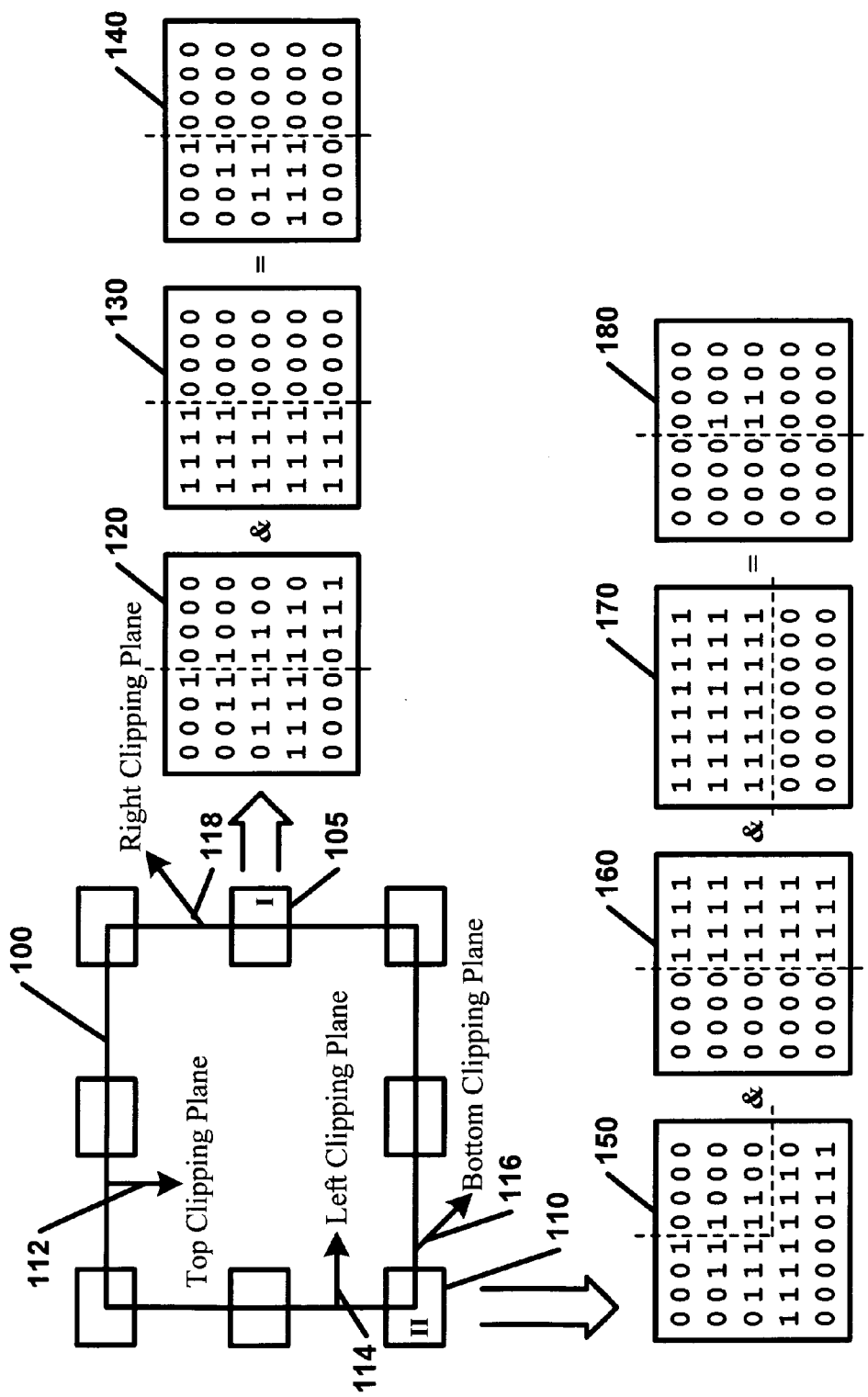
FIG. 1 shows a sample small triangle being clipped as per an aspect of an embodiment of the present invention.

FIG. 1 and FIG. 2 show examples of the clipping algorithms for the left/right/top/bottom planes and near/far planes.

Based on different locations of the small triangles, different pre-stored clipping patterns may be retrieved. Then a bitwise "and" operation may be performed on the small triangle being clipped and the pre-stored clipping patterns. The clipping result should then be sent for scan-conversion. FIG. 1 shows how a sample small triangle may be clipped by the left/right/top/bottom clipping planes. This figure details two clippings. First, a shape that intersects one clipping plane (triangle I 105) and then a more difficult case where a shape intersect two clipping planes (triangle II 110). The second case shows what may happens when the small triangle intersects two clipping planes, where a two-step bitwise "and" operation may be needed to get the desirable result.

As shown in FIG. 1, an image comprising smaller triangles 100 may be bounded by a multitude of clipping planes. This figure is a two dimensionalized example with a top clipping plane 112, a right clipping plane 118, a left clipping plane 114, and a bottom clipping plane 116. Also shown are two example shapes that cross over clipping planes. Shape I 105 crosses over the right clipping plane and shape II 110 crosses over a left clipping plane 114 and bottom clipping plane 116. Clipping result 140 may be generated by performing a logical "AND" operation between pre-stored clipping shape I (shown here as a triangle represented in a pixel matrix 120) and pre-stored right clipping pattern 130. Similarly, clipping result 180 may be generated by performing a logical "AND" operation between pre-stored clipping shape II (shown here as a triangle represented in a pixel matrix 150) with pre-stored left clipping pattern 160 and pre-stored bottom clipping pattern 170.

FIGS. 2A, 2B, 2C, and 2D show how to clip a shape in near and far planes. For a sample triangle, FIG. 2A shows clipping for near/far clipping planes; FIG. 2B shows a projection in a pixel matrix; FIG. 2C shows a pre-stored clipping pattern; and FIG. 2D shows a clipping result. For the near/far planes' clipping algorithm, the original small triangle 205 should first be projected to the clipping plane 210. Then, the two intersection pixels 206 and 207 where the original small triangle intersects with the plane may be calculated. These intersection points 206 and 207 may be used as an index to retrieve the matching pre-stored patterns to perform the bitwise "and" operation with the projected small triangle. Intersection points 206 and 207 define a cutting edge 220. After these operations, only the part of the small triangle that's within the viewing volume needs to be kept.

Generating the Pre-Stored Clipping Patterns For Left/Right/Top/Bottom Clipping Planes Each of the pre-stored clipping patterns is a width×height (e.g. 8×5) pixel matrix which is preferably the same size as the pre-stored triangle pattern. Possible orders for generating the pre-stored clipping patterns for the left/right/top/bottom planes are shown in FIGS. 3A, 3B, 3C, and 3D. FIG. 3A shows pre-stored left plane clipping patterns, FIG. 3B shows pre-stored right plane clipping patterns, FIG. 3C shows pre-stored top plane clipping patterns, and FIG. 3D shows pre-stored bottom plane clipping patterns. For each pattern, the pixels inside the part that will be clipped out by the plane should be set to 0 and the pixels remaining should be set to 1. All these patterns may be generated in advance and stored in a special pixel matrix array for the left/right/top/bottom clipping planes respectively. Preferably, there will be 7 pre-stored patterns each for the left/right clipping planes (named Left 1-7/Right 1-7), and 4 pre-stored patterns each for the top/bottom clipping planes (named Top 1-4/Bottom 1-4).

Now, P(row, col) can be set as a pixel in the clipping pattern with 'row' and 'col' as its position coordinate within the clipping pattern. Pattern generating expressions are listed below.

For Left $n$ pattern $(1 \leq n \leq 7)$, $\begin{cases} P(\text{row}, col) = 0, col \leq n \\ P(\text{row}, col) = 1, col > n \end{cases}$ For Right $n$ pattern $(1 \leq n \leq 7)$, $\begin{cases} P(\text{row}, col) = 0, col > 7 - n + 1 \\ P(\text{row}, col) = 1, col \leq 7 - n + 1 \end{cases}$ For Top $n$ pattern $(1 \leq n \leq 4)$, $\begin{cases} P(\text{row}, col) = 0, \text{row} > 4 - n + 1 \\ P(\text{row}, col) = 1, \text{row} \leq 4 - n + 1 \end{cases}$ For Bottom $n$ pattern $(1 \leq n \leq = 4)$, $\begin{cases} P(\text{row}, col) = 0, \text{row} \leq n \\ P(\text{row}, col) = 1, \text{row} > n \end{cases}$ Generating the Pre-Stored Clipping Patterns for Near/Far Planes For the near/far planes, pixels where the triangle's edges intersect with the plane may be used as an index to determine the shapes of the pre-stored patterns. But using these intersection points 206 and 207 may become inaccurate. So, one may choose to calculate a line equation formed by the intersection pixels 206 and 207 (hereafter referred to as the cutting edge 220). The cutting edge 220 may be extended until it meets the edges of the pixel matrix. The two pixels P1 and P2 where the cutting edge intersects with the edge of pixel matrix may then be used as the index to retrieve the pre-stored patterns (see FIG. 4A).

Figure 4A:
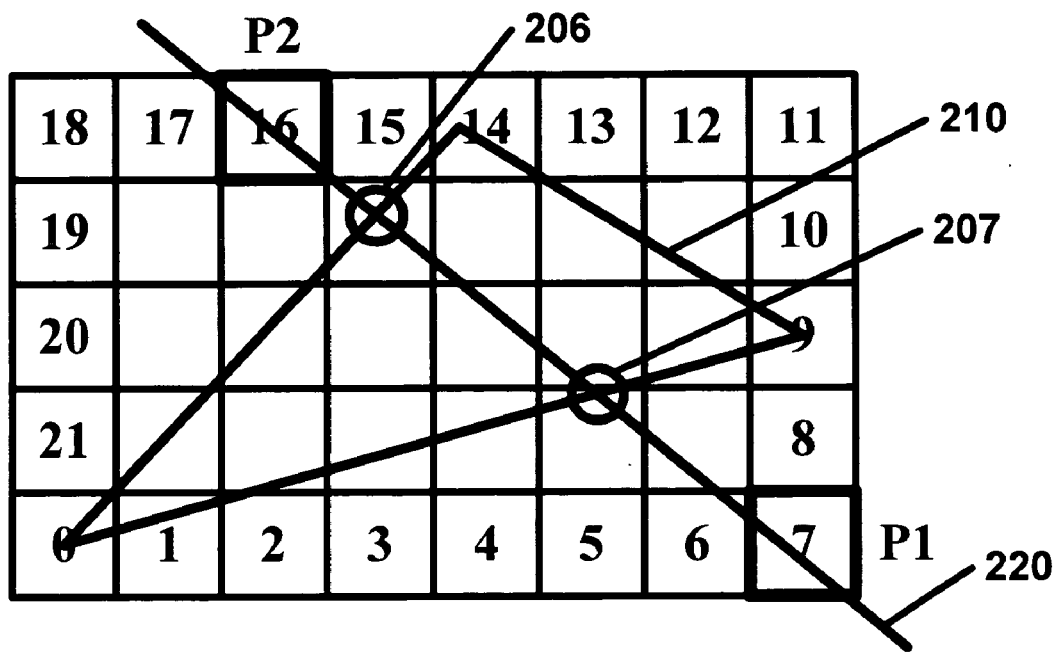
FIG. 4A shows an edge indexed pattern as per an aspect of an embodiment of the present invention.
Figure 4B:
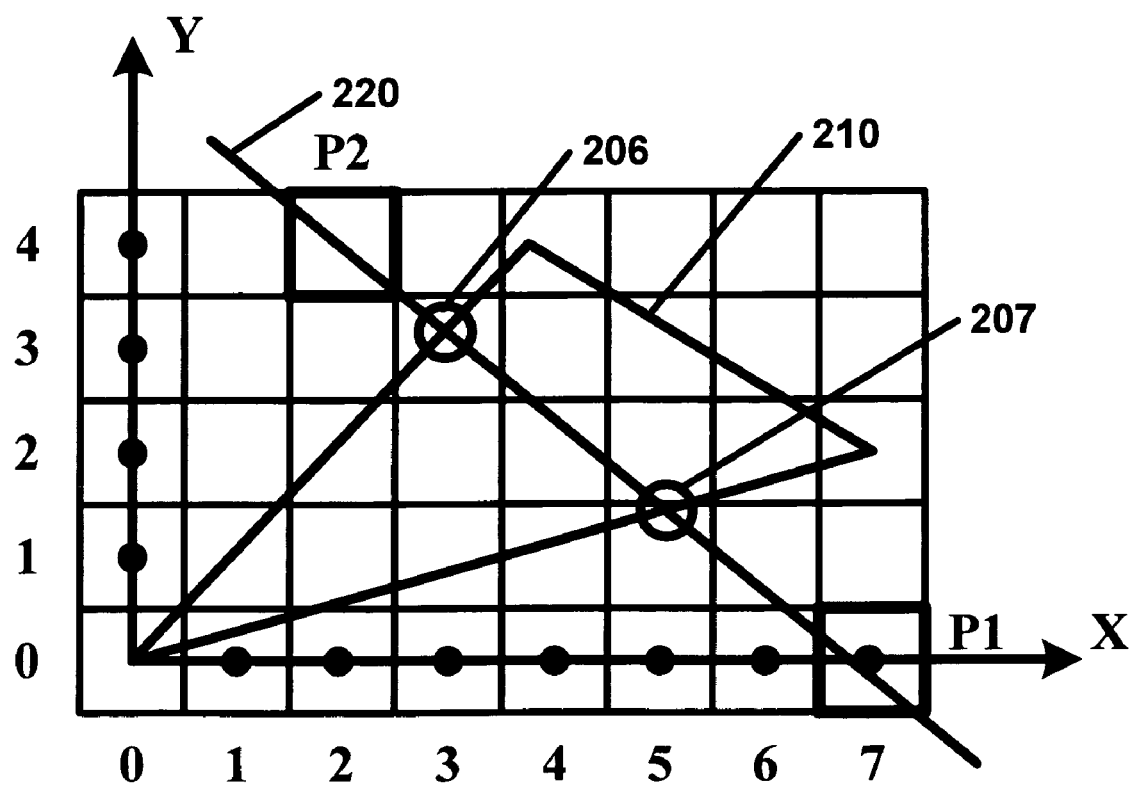
FIG. 4B shows a coordinated pattern as per an aspect of an embodiment of the present invention.
Figure 5:
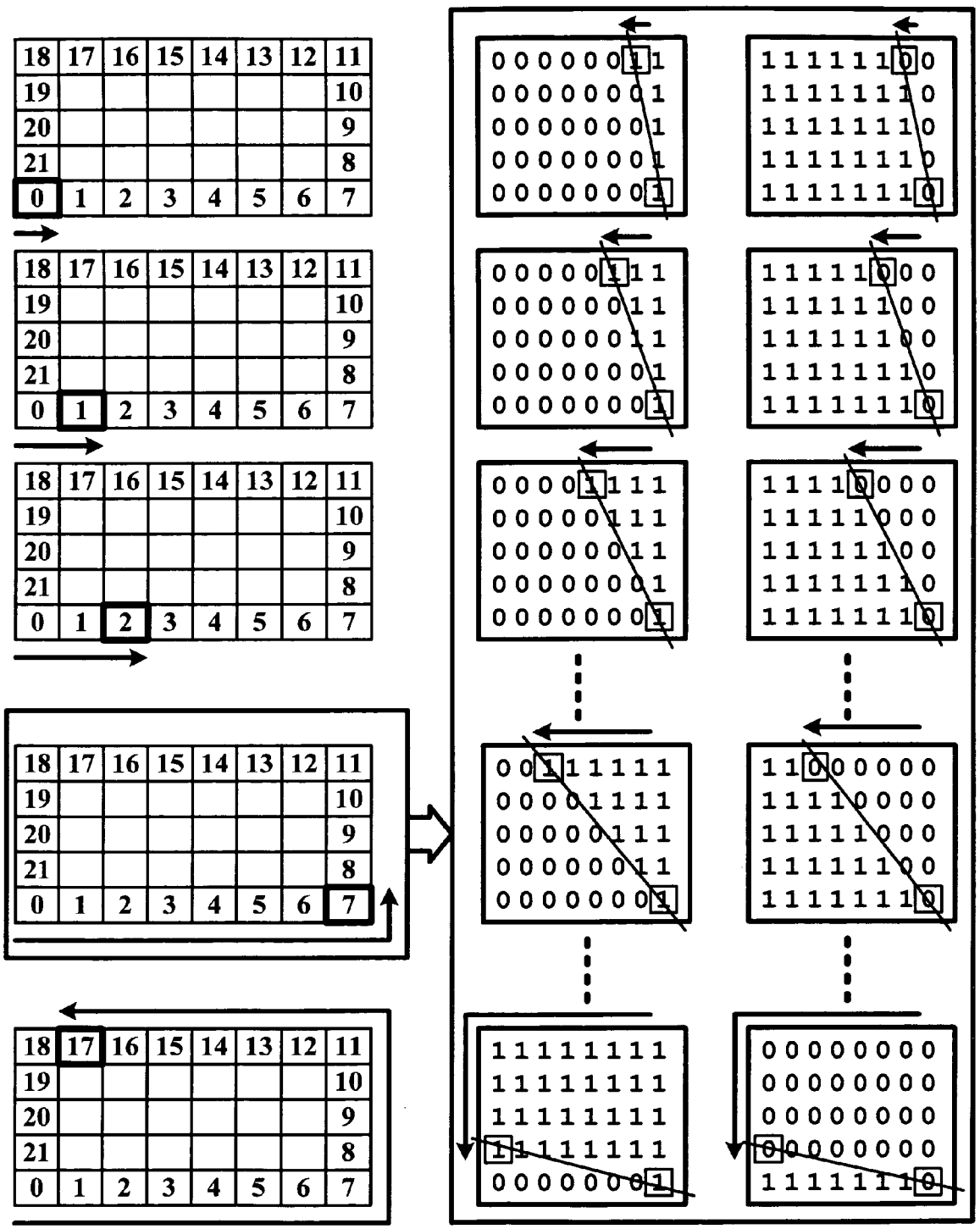
FIG. 5 shows a three-dimensional clipping pattern array for near/far planes as per an aspect of an embodiment of the present invention.

When generating the pre-stored patterns for the near/far planes, the edge pixels of the pixel matrix may first be indexed as shown in FIG. 4A. The pattern matrix may be coordinated to make the introduction more convenient (FIG. 4B). In this illustrative example, the first pixel of cutting edge is referred to as P1 and the second pixel of cutting edge is referred to as P2. In the edge index, P1 equals 7 and P2 equals 16. In the coordinate of the pattern, P1 is (7, 0) and P2 is (2, 4). Each cutting edge 220 of the pattern may be determined by two pixels lying on the edges of the pixel matrix. In order to generate all the possible clipping patterns for the near/far plane, all combinations of P1 and P2 on the edge of pattern matrix may need to be exhausted. P1 may be moved counterclockwise along the edges of the pixel matrix from 0 to 17 as shown by the arrow in the left half of FIG. 5. P2 may be moved along the edges of the pixel matrix according to each position of P1. The pre-stored clipping patterns may be generated in such order that for each first pixel P1 of the cutting edge, all the possible clipping patterns are generated by moving the second pixel P2 of the cutting edge along the path as the arrows show in the right half of FIG. 5. In this way, a three dimensional pattern matrix array may be generated. The position of P1 is the index of the first dimension. The index of the second dimension will be the Position of P2 relative to its beginning position. The index of third dimension is 1/0 represent positive/negative pattern couple (see FIG. 7). Possible combinations are listed in FIG. 6. For instance, when P1 is in the position of 9, there will be ten possible positions for P2 from 12 for 21 (FIG. 5). According to the position of P2, the second dimension index will be from 0 to 9.

For each combination of P1 and P2, a couple of pattern matrices can be generated which may be named as Positive Pattern and Negative Pattern. They can be mapped to each other by the cutting edge (FIG. 5). The coordinates of P1 may be set in the Pattern Matrix as ($x_1$, $y_1$) and the coordinates of P2 as ($x_2$, $y_2$). A randomly chosen pixel in the matrix is represented as P(x, y). A rule for deciding the value of each pixel on the pattern matrix is showed in FIG. 7.

Determine which Pattern to Use

For each small triangle that appears in the scene, a triangle's image pattern may be retrieved with an Image-Based Fast Small Triangle Scan-Conversion Algorithm. Then, the following steps may be taken to determine which pre-stored clipping pattern for this triangle will be chosen based on the clipping plane(s) the small triangle intersects with. At last, an "AND" operation between the triangle pattern and the clipping pattern(s) can mask the clipped part of the triangle. The result image pattern is the one which can be scan-converted to the screen directly.

If the small triangle is cut by left/right/top/bottom clipping plane(s), the appropriate pre-stored clipping patterns may be selected according to the row (if the small triangle is cut by the top/bottom plane) or column (if the small triangle is cut by the left/right plane) the small triangle intersects with the plane(s). This is shown in FIG. 1. For instance, triangle I 105 is clipped by the Right Clipping Plane through its $4^{th}$ column counting from the right most column. So, the Right 4 Pattern may be selected from the Right Plane Clipping Pattern array (FIG. 3). For another instance, triangle II 110 is clipped by the Left Clipping Plane through its $4^{th}$ column counting from the left most column. At the same time, it is clipped by the Bottom Clipping Plane through its $2^{th}$ row counting from the bottom most row. The Left 4 Pattern may be chosen from the Left Plane Clipping Pattern array (FIG. 3) and the Bottom 2 from the Bottom Plane Clipping Pattern array (FIG. 3). A logical AND operation may be performed on these two pre-stored clipping patterns and the triangle pattern to get the clipping result.

If the small triangle is cut by the near/far clipping plane, the intersection pixels 206 and 207 which are the two circled points the triangle edges intersect with the clipping plane in FIG. 2 may be calculated. The cutting edge 220 which is the line formed by the two Intersection Pixels 206 and 207 may then be obtained. The points where the cutting edge 220 and the edge of the triangle Pattern Matrix intersect with each other are referred to in this illustrative example as the first and second pixel of the cutting edge (P1 and P2 in FIG. 4). With the exact position of P1 and P2 on the clipping pattern, the first and the second index may be gotten. The third index can be calculated following the formula shown in FIG. 7. With the three indices, the clipping pattern for this triangle 205 may be fetched from the three-dimensional clipping pattern array for the near/far planes. The result of the "AND" operation between the triangle's pattern and the clipping pattern is the image that may be scan-converted to the screen.

Illustrative Example

Figure 8:
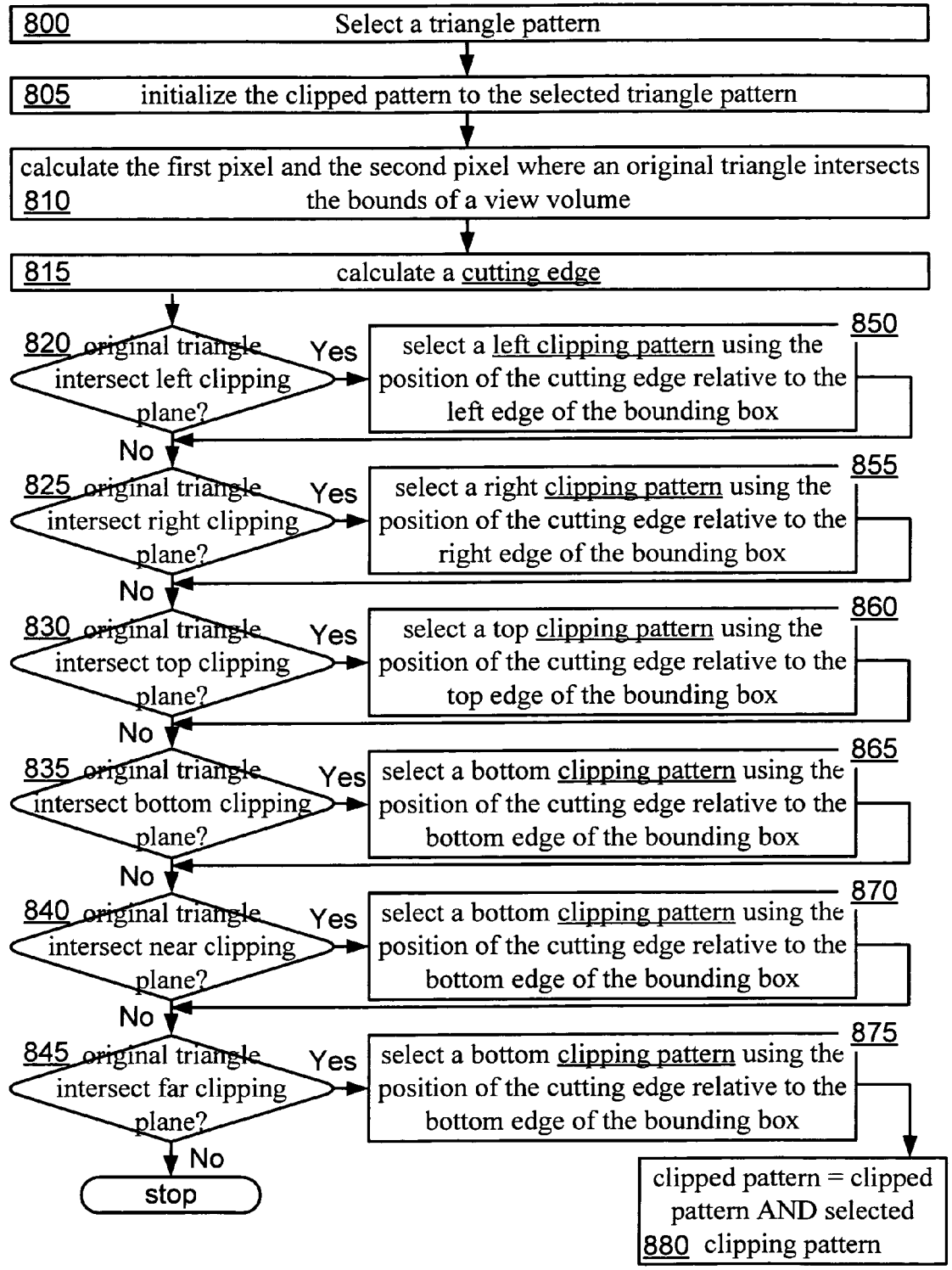
FIG. 8 shows a flow diagram of an image-based triangle clipping computer program as per an aspect of an embodiment of the present invention.

The present invention is a tangible computer-readable medium encoded with an image-based triangle clipping computer program. This image-based triangle clipping computer program when executed by one or more processors should cause the processor(s) to generate a clipped pattern. FIG. 8 shows a flow diagram of an image-based triangle clipping computer program as per an aspect of an embodiment of the present invention. To generate this clipped pattern, the processors preferably perform the following functions. Fist, a selected triangle pattern may be selected from a multitude of triangle patterns at 800. The selected triangle pattern may be selected using coordinates from an original triangle. Each of the triangle patterns should fit within a bounding box having a prescribed width and a height. Next, at 805, the clipped pattern should be initialized to the selected triangle pattern. At 810, a first and second pixel may be calculated where an original triangle intersects the bounds of a view volume. The view volume bounded by: a near clipping plane; a far clipping plane, the far clipping plane being parallel to the near clipping plane; a left clipping plane, the left clipping plane being perpendicular to the near clipping plane; a right clipping plane, the right clipping plane being parallel to the left clipping plane; an top clipping plane, the top clipping plane being perpendicular to both the near clipping plane and the left clipping plane; and a bottom clipping plane, the bottom clipping plane being parallel to the top clipping plane. A cutting edge may then be calculated at 815. A cutting edge is the line which runs through the first pixel and the second pixel.

A determination should be made at 820 whether the original triangle intersects the left clipping plane. If the determination is positive, then at 850 a selected left clipping pattern should be selected from a multitude of left clipping patterns using the position of the cutting edge relative to the left edge of the bounding box. The multitude of left clipping patterns may include (width−1) left clipping patterns. Each of the (width−1) left clipping patterns may be: indexed by a variable n; a matrix of pixels, where each of the pixels may be located by a row and column locator in the form of P(row, column); and where for the variable n>=1 and n<=(width-1): P(row, column)=0, when column<=n; and P(row, column)=1, when column>n.

A determination should be made at 825 whether the original triangle intersects the right clipping plane. If the determination is positive, then at 855 a selected right clipping pattern should be selected from a multitude of right clipping patterns using the position of the cutting edge relative to the right edge of the bounding box. The multitude of right clipping patterns may include (width−1) right clipping patterns. Each of the (width−1) right clipping patterns may be: indexed by a variable n; a matrix of pixels, where each of the pixels is located by a row and column locator in the form of P(row, column); and where for the variable n>=1 and n<=(width−1): P(row, column)=0, when column>width−n; and P(row, column)=1, when column<=width−n.

A determination should be made at 830 whether the original triangle intersects the top clipping plane. If the determination is positive, then at 860 a selected top clipping pattern should be selected from a multitude of top clipping patterns using the position of the cutting edge relative to the top edge of the bounding box. The multitude of top clipping patterns may include (height−1) top clipping patterns. Each of the (height−1) top clipping patterns may be: indexed by a variable n; a matrix of pixels, where each of the pixels is located by a row and column locator in the form of P(row, column); and where for the variable n>=1 and n<=(height−1): P(row, column)=0, when row>height−n; and P(row, column)=1, when row<=height−n.

A determination should be made at 835 whether the original triangle intersects the bottom clipping plane. If the determination is positive, then at 865 a selected bottom clipping pattern should be selected from a multitude of bottom clipping patterns using the position of the cutting edge relative to the bottom edge of the bounding box. The multitude of bottom clipping patterns may include (height−1) bottom clipping patterns. Each of the (height−1) bottom clipping patterns may be: indexed by a variable n; a matrix of pixels, where each of the pixels is located by a row and column locator in the form of P(row, column); and where for the variable n>=1 and n<=(height−1): P(row, column)=0, when row <=n; and P(row, column)=1, when row>n.

A determination should be made at 840 whether the original triangle intersects the near clipping plane. If the determination is positive, then at 870 a selected near clipping pattern should be selected from a multitude of near/far clipping patterns using the position of the cutting edge relative to the edges of the bounding box. Similarly, a determination should be made at 845 whether the original triangle intersects the far clipping plane. If the determination is positive, then at 875 a selected far clipping pattern should be selected from a multitude of near/far clipping patterns using the position of the cutting edge relative to the edges of the bounding box. Each of the near clipping patterns and the far clipping patterns may be a matrix of pixels, where each of the pixels is located by an x value and a y value in the form of P(x, y). The matrix of pixels may include a positive matrix of pixels and a negative matrix of pixels where x1, y1 and x2, y2 are the iterative combinations of possible lines crossing the matrix. The positive matrix of pixels may be defined by: when x1 is not equal to x2, then: P(x,y)=1 if ((y2−y1)/x2−x1))(x−x1)+y1>=y; and P(x,y)=0 if ((y2−y1)/x2−x1))(x−x1)+y1<y; and when x1 is equal to x2, then: P(x,y)=1 if x<=x1; and P(x,y)=0 if x>x1. The negative matrix of pixels may be defined by: when x1 is not equal to x2, then: P(x,y)=0 if ((y2−y1)/x2−x1))(x−x1)+y1>=y; and P(x,y)=1 if ((y2−y1)/x2−x1))(x−x1)+y1<y; and when x1 is equal to x2, then: P(x,y)=0 if x<=x1; and P(x,y)=1 if x>x1.

One skilled in the art will recognize that each of the previously described determinations may not all need to be made once one of the determination is found to be positive. Finally, at 880, the clipped pattern should be set equal to the bitwise AND of the clipped pattern and the selected right clipping pattern (whether it is a left, right, top, bottom, near, or far clipped pattern).

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. Although parts of the disclosure described the claimed invention being used in face recognition applications, one skilled in the art will recognize that the claimed invention is in fact much broader. For example, although the invention is described as a mechanism to clip small triangles, one skilled in the art will recognize that the invention could be used to clip any size triangle. Similarly, one skilled in the art will recognize that the present invention may be used to clip other shapes, such as squares, rectangles, hexagons, free form shapes, etc.

What is claimed is:

1. A tangible computer-readable medium encoded with an image-based triangle clipping computer program, wherein execution of said "computer program" by one or more processors causes said "one or more processors" to generating a clipped pattern by performing the steps of:
   a) selecting a selected triangle pattern from a multitude of triangle patterns, said selected triangle pattern selected using coordinates from an original triangle, each of said triangle patterns fitting within a bounding box, said bounding box having a width and a height;
   b) initialize the clipped pattern to said selected triangle pattern;
   c) calculating the first pixel and the second pixel where an original triangle intersects the bounds of a view volume, said view volume bounded by:
      i) a near clipping plane;
      ii) a far clipping plane, said far clipping plane being parallel to said near clipping plane;
      iii) a left clipping plane, said left clipping plane being perpendicular to said near clipping plane;
      iv) a right clipping plane, said right clipping plane being parallel to said left clipping plane;
      v) an top clipping plane, said top clipping plane being perpendicular to both said near clipping plane and said left clipping plane; and
      vi) a bottom clipping plane, said bottom clipping plane being parallel to said top clipping plane;
   d) calculating a cutting edge, said cutting edge being the line which runs through said first pixel and said second pixel;
   e) if said original triangle intersects said left clipping plane, then:
      i) selecting a selected left clipping pattern from a multitude of left clipping patterns, said selected left clipping pattern selected using the position of said cutting edge relative to the left edge of said bounding box; and
      ii) setting said clipped pattern equal to the bitwise AND of said clipped pattern and said selected left clipping pattern;
   f) if said original triangle intersects said right clipping plane, then:
      i) selecting a selected right clipping pattern from a multitude of right clipping patterns, said selected right clipping pattern selected using the position of said cutting edge relative to the right edge of said bounding box; and
      ii) setting said clipped pattern equal to the bitwise AND of said clipped pattern and said selected right clipping pattern;
   g) if said original triangle intersects said top clipping plane, then:
      i) selecting a selected top clipping pattern from a multitude of top clipping patterns, said selected top clipping pattern selected using the position of said cutting edge relative to the top edge of said bounding box; and
      ii) setting said clipped pattern equal to the bitwise AND of said clipped pattern and said selected top clipping pattern;
   h) if said original triangle intersects said bottom clipping plane, then:
      i) selecting a selected bottom clipping pattern from a multitude of bottom clipping patterns, said selected bottom clipping pattern selected using the position of said cutting edge relative to the bottom edge of said bounding box; and
      ii) setting said clipped pattern equal to the bitwise AND of said clipped pattern and said selected bottom clipping pattern;
   i) if said original triangle intersects said near clipping plane, then:
      i) selecting a selected near clipping pattern from a multitude of near/far clipping patterns, said selected near clipping pattern selected using the two locations where the cutting edge intersects the edge of said bounding box; and ii) setting said clipped pattern equal to the bitwise AND of said clipped pattern and said selected near clipping pattern; and
j) if said original triangle intersects said far clipping plane, then:
  i) selecting a selected far clipping pattern from a multitude of near/far clipping patterns, said selected far clipping pattern selected using the two locations where the cutting edge intersects the edge of said bounding box; and
  ii) setting said clipped pattern equal to the bitwise AND of said clipped pattern and said selected far clipping pattern.

2. A tangible computer-readable medium according to claim 1, wherein said multitude of left clipping patterns is (width−1) left clipping patterns and said multitude of right clipping patterns is (width−1) right clipping patterns.

3. A tangible computer-readable medium according to claim 2, wherein each of said (width−1) right clipping patterns:
  a) is indexed by a variable n;
  b) is a matrix of pixels, each of said pixels being located by a row and column locator in the form of P(row, column); and
  c) wherein for the variable n>=1 and n<=(width-1):
    i) P(row, column)=0, when column>width−n; and
    ii) P(row, column)=1, when column<=width−n.

4. A tangible computer-readable medium according to claim 1, wherein said multitude of top clipping patterns is (height−1) top clipping patterns and said multitude of bottom clipping patterns is (height−1) bottom clipping patterns.

5. A tangible computer-readable medium according to claim 2, wherein each of said (width−1) left clipping patterns:
  a) is indexed by a variable n;
  b) is a matrix of pixels, each of said pixels being located by a row and column locator in the form of P(row, column); and
  c) wherein for the variable n>=1 and n<=(width-1):
    i) P(row, column)=0, when column<=n; and
    ii) P(row, column)=1, when column>n.

6. A tangible computer-readable medium according to claim 5, wherein each of said near clipping patterns and said far clipping patterns:
  a) is a matrix of pixels, each of said pixels being located by an x value and a y value in the form of P(x, y);
  b) said matrix of pixels including a positive matrix of pixels and a negative matrix of pixels;
  c) x1, y1 and x2, y2 are the iterative combinations of possible lines crossing said matrix;
  d) said positive matrix of pixels defined by:
    i) when x1 is not equal to x2, then:
      (1) P(x,y)=1 if ((y2−y1)/x2−x1))(x−x1)+y1>=y; and
      (2) P(x,y)=0 if ((y2−y1)/x2−x1))(x−x1)+y1<y;
    ii) when x1 is equal to x2, then:
      (1) P(x,y)=1 if x<=x1; and
      (2) P(x,y)=0 if x>x1;
  e) said negative matrix of pixels defined by:
    i) when x1 is not equal to x2, then:
      (1) P(x,y)=0 if ((y2−y1)/x2−x1))(x−x1)+y1>=y; and
      (2) P(x,y)=1 if ((y2−y1)/x2−x1))(x−x1)+y1<y;
    ii) when x1 is equal to x2, then:
      (1) P(x,y)=0 if x<=x1; and
      (2) P(x,y)=1 if x>x1.

7. A tangible computer-readable medium according to claim 4, wherein each of said (height−1) top clipping patterns:
  a) is indexed by a variable n;
  b) is a matrix of pixels, each of said pixels being located by a row and column locator in the form of P(row, column); and
  c) wherein for the variable n>=1 and n<=(height-1):
    i) P(row, column)=0, when row>height−n; and
    ii) P(row, column)=1, when row<=height−n.

8. A tangible computer-readable medium according to claim 4, wherein each of said (height−1) bottom clipping patterns:
  a) is indexed by a variable n;
  b) is a matrix of pixels, each of said pixels being located by a row and column locator in the form of P(row, column); and
  c) wherein for the variable n>=1 and n<=(height-1):
    i) P(row, column)=0, when row<=n; and
    ii) P(row, column)=1, when row>n.

9. A tangible computer-readable medium encoded with an image-based shape clipping computer program, wherein execution of said "computer program" by one or more processors causes said "one or more processors" to generating a clipped pattern by performing the steps of:
  a) selecting a selected shape pattern from a multitude of shape patterns, said selected shape pattern selected using coordinates from an original shape, each of said shape patterns fitting within a bounding box, said bounding box having a width and a height;
  b) initialize the clipped pattern to said selected shape pattern;
  c) calculating the first pixel and the second pixel where an original shape intersects the bounds of a view volume, said view volume bounded by:
    i) a near clipping plane;
    ii) a far clipping plane, said far clipping plane being parallel to said near clipping plane;
    iii) a left clipping plane, said left clipping plane being perpendicular to said near clipping plane;
    iv) a right clipping plane, said right clipping plane being parallel to said left clipping plane;
    v) an top clipping plane, said top clipping plane being perpendicular to both said near clipping plane and said left clipping plane; and
    vi) a bottom clipping plane, said bottom clipping plane being parallel to said top clipping plane;
  d) calculating a cutting edge, said cutting edge being the line which runs through said first pixel and said second pixel;
  e) if said original shape intersects said left clipping plane, then:
    i) selecting a selected left clipping pattern from a multitude of left clipping patterns, said selected left clipping pattern selected using the position of said cutting edge relative to the left edge of said bounding box; and
    ii) setting said clipped pattern equal to the bitwise AND of said clipped pattern and said selected left clipping pattern;
  f) if said original shape intersects said right clipping plane, then:
    i) selecting a selected right clipping pattern from a multitude of right clipping patterns, said selected right clipping pattern selected using the position of said cutting edge relative to the right edge of said bounding box; and
    ii) setting said clipped pattern equal to the bitwise AND of said clipped pattern and said selected right clipping pattern;

g) if said original shape intersects said top clipping plane, then:
  i) selecting a selected top clipping pattern from a multitude of top clipping patterns, said selected top clipping pattern selected using the position of said cutting edge relative to the top edge of said bounding box; and
  ii) setting said clipped pattern equal to the bitwise AND of said clipped pattern and said selected top clipping pattern;
h) if said original shape intersects said bottom clipping plane, then:
  i) selecting a selected bottom clipping pattern from a multitude of bottom clipping patterns, said selected bottom clipping pattern selected using the position of said cutting edge relative to the bottom edge of said bounding box; and
  ii) setting said clipped pattern equal to the bitwise AND of said clipped pattern and said selected bottom clipping pattern;
i) if said original shape intersects said near clipping plane, then:
  i) selecting a selected near clipping pattern from a multitude of near clipping patterns, said selected near clipping pattern selected using the two locations where the cutting edge intersects the edge of said bounding box; and
  ii) setting said clipped pattern equal to the bitwise AND of said clipped pattern and said selected near clipping pattern; and
j) if said original shape intersects said far clipping plane, then:
  i) selecting a selected far clipping pattern from a multitude of far clipping patterns, said selected far clipping pattern selected using the two locations where the cutting edge intersects the edge of said bounding box; and
  ii) setting said clipped pattern equal to the bitwise AND of said clipped pattern and said selected far clipping pattern.

10. A tangible computer-readable medium according to claim 9, wherein said multitude of left clipping patterns is (width−1) left clipping patterns and said multitude of right clipping patterns is (width−1) right clipping patterns.

11. A tangible computer-readable medium according to claim 10, wherein each of said (width−1) left clipping patterns:
  a) is indexed by a variable n;
  b) is a matrix of pixels, each of said pixels being located by a row and column locator in the form of P(row, column); and
  c) wherein for the variable $n \geq 1$ and $n \leq (width-1)$:
    i) P(row, column)=0, when column$\leq$n; and
    ii) P(row, column)=1, when column>n.

12. A tangible computer-readable medium according to claim 11, wherein each of said near clipping patterns and said far clipping patterns:
  a) is a matrix of pixels, each of said pixels being located by an x value and a y value in the form of P(x, y);
  b) said matrix of pixels including a positive matrix of pixels and a negative matrix of pixels;
  c) x1, y1 and x2, y2 are the iterative combinations of possible lines crossing said matrix;
  d) said positive matrix of pixels defined by:
    i) when x1 is not equal to x2, then:
      (1) P(x,y)=1 if $((y2-y1)/(x2-x1))(x-x1)+y1 \geq y$; and
      (2) P(x,y)=0 if $((y2-y1)/(x2-x1))(x-x1)+y1 < y$;
    ii) when x1 is equal to x2, then:
      (1) P(x,y)=1 if $x \leq x1$; and
      (2) P(x,y)=0 if x>x1;
  e) said negative matrix of pixels defined by:
    i) when x1 is not equal to x2, then:
      (1) P(x,y)=0 if $((y2-y1)/(x2-x1))(x-x1)+y1 \geq y$; and
      (2) P(x,y)=1 if $((y2-y1)/(x2-x1))(x-x1)+y1 < y$;
    ii) when x1 is equal to x2, then:
      (1) P(x,y)=0 if $x \leq x1$; and
      (2) P(x,y)=1 if x>x1.

13. A tangible computer-readable medium according to claim 10, wherein each of said (width−1) right clipping patterns:
  a) is indexed by a variable n;
  b) is a matrix of pixels, each of said pixels being located by a row and column locator in the form of P(row, column); and
  c) wherein for the variable $n \geq 1$ and $n \leq (width-1)$:
    i) P(row, column)=0, when column>width−n+1; and
    ii) P(row, column)=1, when column$\leq$width−n+1.

14. A tangible computer-readable medium according to claim 9, wherein said multitude of top clipping patterns is (height−1) top clipping patterns and said multitude of bottom clipping patterns is (height−1) bottom clipping patterns.

15. A tangible computer-readable medium according to claim 14, wherein each of said (height−1) top clipping patterns:
  a) is indexed by a variable n;
  b) is a matrix of pixels, each of said pixels being located by a row and column locator in the form of P(row, column); and
  c) wherein for the variable $n \geq 1$ and $n \leq (height-1)$:
    i) P(row, column)=0, when row>height−n+1; and
    ii) P(row, column)=1, when row$\leq$height−n+1.

16. A tangible computer-readable medium according to claim 14, wherein each of said (height−1) bottom clipping patterns:
  a) is indexed by a variable n;
  b) is a matrix of pixels, each of said pixels being located by a row and column locator in the form of P(row, column); and
  c) wherein for the variable $n \geq 1$ and $n \leq (height-1)$:
    i) P(row, column)=0, when row$\leq$n; and
    ii) P(row, column)=1, when row>n.

* * * * *